US011644909B2

(12) United States Patent
Wu et al.

(10) Patent No.: US 11,644,909 B2
(45) Date of Patent: May 9, 2023

(54) ELECTRONIC PEN BUTTON ASSEMBLY, METHOD FOR ASSEMBLING SAME, AND ELECTRONIC PEN

(71) Applicant: BOE Technology Group Co., Ltd., Beijing (CN)

(72) Inventors: Yunpeng Wu, Beijing (CN); Lei Cao, Beijing (CN); Zifeng Wang, Beijing (CN); Yan Ren, Beijing (CN); Xinyan Shi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/579,431

(22) Filed: Jan. 19, 2022

(65) Prior Publication Data
US 2022/0236815 A1 Jul. 28, 2022

(30) Foreign Application Priority Data

Jan. 22, 2021 (CN) .......................... 202120189062.7

(51) Int. Cl.
  *G06F 3/0354* (2013.01)
  *G06F 3/02* (2006.01)
(52) U.S. Cl.
  CPC ........ *G06F 3/03545* (2013.01); *G06F 3/0202* (2013.01)

(58) Field of Classification Search
  None
  See application file for complete search history.

(56) References Cited

U.S. PATENT DOCUMENTS

| | | | | |
|---|---|---|---|---|
| 2007/0042620 A1* | 2/2007 | Lapstun | ................ | G06F 3/0321 439/157 |
| 2017/0322643 A1* | 11/2017 | Eguchi | .................. | G06F 3/0442 |
| 2019/0369758 A1* | 12/2019 | Yamashita | ............ | G06F 3/0383 |
| 2020/0050294 A1* | 2/2020 | Hsu | ........................ | G06F 3/044 |

FOREIGN PATENT DOCUMENTS

| | | | | |
|---|---|---|---|---|
| CN | 111823756 A | * | 10/2020 | |
| JP | 6159874 B2 | * | 7/2017 | ......... G06F 3/03545 |
| WO | WO-2022050015 A1 | * | 3/2022 | |

* cited by examiner

*Primary Examiner* — Kirk W Hermann
(74) *Attorney, Agent, or Firm* — Ipro, PLLC (57) ABSTRACT

An electronic pen button assembly includes a pen core, a housing, and a button. The pen core includes a rod body and a pen tip disposed at a first end of the rod body. A first limiting portion is disposed on the rod body. The housing includes a pen head with a via hole, and a second limiting portion is disposed in the housing. The rod body extends into the housing through the via hole, and the first limiting portion is matably connected to the second limiting portion. The pen core is in sliding fit relative to the housing in an extension direction of the rod body. The button is disposed in the housing, and the bottom is triggerable by a second end of the rod body during sliding of the pen core along the extension direction of the rod body.

18 Claims, 11 Drawing Sheets

ELECTRONIC PEN BUTTON ASSEMBLY, METHOD FOR ASSEMBLING SAME, AND ELECTRONIC PEN

CROSS-REFERENCE TO RELATED APPLICATION

The present disclosure claims priority to Chinese Patent Application No. 202120189062.7, filed on Jan. 22, 2021 and entitled "ELECTRONIC PEN BUTTON ASSEMBLY AND ELECTRONIC PEN," the disclosure of which is herein incorporated by reference in its entirety.

TECHNICAL FIELD

The present disclosure relates to the field of electronic products technologies, and in particular, relates to an electronic pen button assembly, a method for assembling the same, and an electronic pen.

BACKGROUND

With the continuous development of electronic devices, different types of electronic pen products, such as reading pens, translating pens, styluses, and dot matrix pens are coming into the market. In the related art, in order to imitate the shape of traditional writing pens and the hand feeling of traditional writing pens, head triggering buttons of electronic pens are designed according to pen cores of the traditional writing pens.

SUMMARY

Embodiments of the present disclosure provides an electronic pen button assembly, a method for assembling the same, and an electronic pen.

In one aspect of the embodiments of the present disclosure, an electronic pen button assembly is provided. The electronic pen button assembly includes:

a pen core including a rod body and a pen tip disposed at a first end the rod body, wherein the rod body is provided with a first limiting portion;

a housing including a pen head with a via hole, wherein the housing is provided with a second limiting portion, the rod body extends into the housing through the via hole, the first limiting portion is matably connected to the second limiting portion, and the pen core is in sliding fit relative to the housing in an extension direction of the pen core; and a button disposed in the housing, wherein the button is triggerable by a second end of the rod body during axial sliding of the pen core.

In some embodiments, the first limiting portion is a groove formed in the rod body, and the second limiting portion is a support member fixed in the housing, wherein a bump matable with the groove is formed on the support member, and in an extension direction of the rod body, the span of the groove is greater than the span of the bump.

In some embodiments, a side, distal from the pen tip, of the groove forms a first engagement surface, and a side, facing towards the first engagement surface, of the bump forms a second engagement surface.

In some embodiments, the support member further includes two first limiting ribs disposed on two sides of the bump respectively, wherein the two first limiting ribs are configured to define a passage for allowing the rod body to pass through.

In some embodiments, a guide slope is formed on the side, facing towards the via hole, of the bump.

In some embodiments, a foolproof portion is disposed at the second end of the rod body, and a third limiting portion matable with the foolproof portion is disposed on the support member;

wherein in the case that the foolproof portion and the third limiting portion are in a mated state, the rod body is allowed to reciprocate in the extension direction of the rod body and restrict the rod body from rotating about an axis of the rod body, the axis of the rod body being parallel to the extension direction of the rod body.

In some embodiments, the foolproof portion includes a foolproof sheet disposed along the extension direction of the rod body, and the third limiting portion includes two second limiting ribs disposed on the support member, wherein a distance between the two second limiting ribs matches a thickness of the foolproof sheet.

In some embodiments, a guide slope is formed on a side, facing towards the via hole, of the bump, and two third limiting ribs are disposed on the guide slope, wherein a distance between the two third limiting ribs is greater than the thickness of the foolproof sheet.

In some embodiments, the housing further includes a first housing and a second housing which are engaged with each other;

wherein the first housing and the second housing are connected to the pen head in response to being engaged with each other, the support member is disposed on the first housing, and a first protrusive portion is disposed on the inner wall of the second housing, an end portion of the first protrusive portion being abutted against the surface of the rod body.

In some embodiments, the support member is detachably connected to the first housing.

In some embodiments, a second protrusive portion, and a button board for fixing the button are further disposed on the inner wall of the second housing, wherein the button board is disposed between the first protrusive portion and the second protrusive portion and is snugly engaged with the second protrusive portion.

In some embodiments, a guide groove is disposed between the first protrusive portion and the second protrusive portion; wherein the button board may slide along a slope of the guide groove.

In some embodiments, the rod body adopts an integral design.

In some embodiments, the rod body adopts a split design.

In some embodiments, the first limiting portion is a pin shaft disposed on the rod body, and the second limiting portion is a slideway formed in the housing, wherein an extension direction of the slideway is parallel to an extension direction of the rod body.

In some embodiments, the housing further includes a first housing and a second housing which are engaged with each other, wherein the first housing and the second housing are connected to the pen head in response to being engaged with each other; and the slideway includes two slideway holes formed in the pen head, a first sliding groove formed in the first housing and a second sliding groove formed in the second housing, wherein the pin shaft runs through the slideway holes, and two ends of the pin shaft are disposed in the first sliding groove and the second sliding groove respectively in a mating fashion.

In some embodiments, the section of the rod body is elliptical.

In some embodiments, a guide section that matches a shape of the rod body is formed on the via hole portion of the pen head.

In another aspect of the embodiments of the present disclosure, a method for assembling an electronic pen button assembly is provided. The method includes:

acquiring a pen core, a housing and a button, wherein the pen core includes a rod body and a pen tip disposed at a first end of the rod body, the rod body being provided with a first limiting portion; the housing includes a pen head with a via hole, and the housing is provided with a second limiting portion; and the button is disposed in the housing;

passing the rod body through the via hole into the housing; and matably connecting the first limiting portion of the rod body to the second limiting portion in the housing, and causing the pen core to slide relative to the housing in an extension direction of the rod body, wherein the button is triggerable by a second end of the rod body during sliding of the pen core.

In another aspect of the embodiments of the present disclosure, an electronic pen is provided. The electronic pen includes a data processing structure and an electronic pen button assembly, wherein the electronic pen button assembly includes:

a pen core including a rod body and a pen tip disposed at a first end of the rod body, wherein the rod body is provided with a first limiting portion;

a housing including a pen head with a via hole, wherein the housing is provided with a second limiting portion, the rod body extends into the housing through the via hole, the first limiting portion is matably connected to the second limiting portion, and the pen core is in sliding fit relative to the housing in an extension direction of the pen core; and a button disposed in the housing, wherein the button is triggerable by a second end of the rod body during sliding of the pen core.

BRIEF DESCRIPTION OF THE DRAWINGS

The accompanying drawings, which constitute a part of the present disclosure, are provided for further understanding of the present disclosure, so that the other features, purposes and advantages of the present disclosure will become more apparent. The exemplary embodiments, the accompanying drawings and the description thereof are used to explain the present disclosure and do not constitute an improper limitation to the present disclosure. In the accompanying drawings.

Reference numerals and denotations thereof:

1—pen core; 101—rod body; 102—pen tip; 103—groove; 104—first engagement surface; 105—foolproof sheet; 106—third engagement surface; 107—fixing hole; 2—pen head; 201—via hole; 202—end surface; 203—guide section; 204—slideway hole; 3—first housing; 301—first sliding groove; 4—support member; 401—bump; 402—first supporting surface; 403—second supporting surface; 404—second engagement surface; 405—first limiting rib; 406—guide slope; 407—second limiting rib; 408—third limiting rib; 409—fixing groove; 5—button; 501—button board; 6—second housing; 601—first protrusive portion; 602—guide groove; 603—second protrusive portion; 604—second sliding groove; 7—pin shaft;

001—pen tip button structure body; 002—pen head housing; 003—pen body housing; 004—retraction spring; 005—button electronic device; and 01—electronic pen button assembly; and 02—data processing structure.

DETAILED DESCRIPTION

In order to make those skilled in the art better understand the solutions of the present disclosure, the technical solutions of embodiments of the present disclosure will be clearly and completely described below in conjunction with accompanying drawings of the embodiments of the present disclosure. Obviously, the described embodiments are not all of but merely a part of the embodiments of the present disclosure. Based on the embodiments of the present disclosure, all the other embodiments derived by those ordinary skilled in the art without creative efforts shall fall within the protection scope of the present disclosure.

It should be noted that the terms "include," "have," and any of their variations in the description and claims of the present disclosure and the above accompanying drawings are intended to cover non-exclusive inclusions. For example, a system, a product, or a device which includes a series of units is not necessarily limited to those units clearly listed, but may include their units that are not clearly listed or are inherent to the product or device.

In the present disclosure, orientation or positional relationships indicated by the terms "upper," "lower," "inner," "intermediate," "outer," and the like are orientation or positional relationships shown based on the accompanying drawings. These terms are mainly for the purposes of better describing the present disclosure and the embodiments of the present disclosure, and are not intended to limit that the specified apparatus, element or component has to be specifically located, or structured and operated in a specific direction.

In addition, part of the above terms may be used to indicate other meanings in addition to indicating the orientation or positional relationships. For example, the term "upper" may also be used to indicate certain attachment relationship or connection relationship in some cases. Those of ordinary skill in the art may understand the specific meanings of these terms in the present disclosure according to specific situations.

In addition, the terms "disposed," "connection," and "fixing" should be understood in a broad sense. For example, the term "connection" may be a fixed connection, a detachable connection, or an integral structure; a mechanical connection or an electrical connection; a direct connection, or an indirect connection through an intermediate medium, or internal communication between two apparatuses, two elements or components. Those ordinary skilled in the art may understand the specific meanings of the above terms in the present disclosure according to specific situations.

It should be noted that the embodiments in the present disclosure and the features in the embodiments may be combined with one another under the condition of no conflict.

Figure 1:
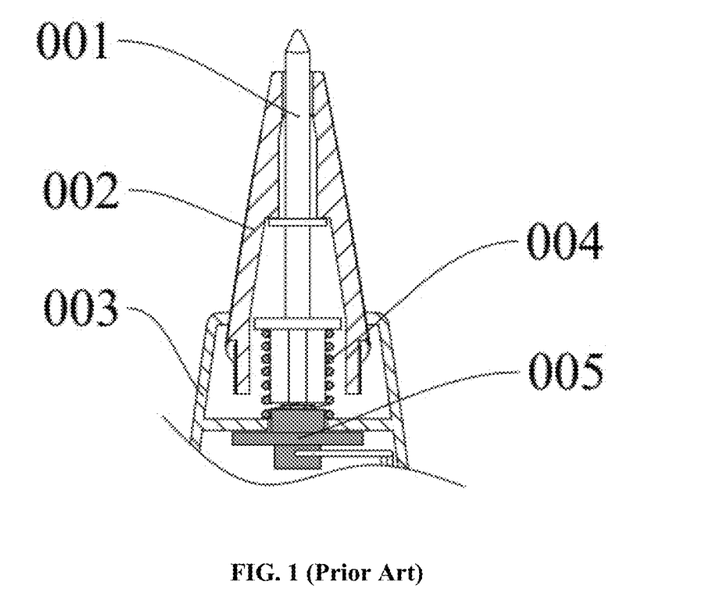
FIG. 1 is a sectional view of a first built-in electronic pen button structure.

As shown in FIG. 1, which shows a common built-in button structure of an electronic pen, this structure includes a pen tip button structure body 001, a pen head housing 002, a pen body housing 003, a retraction spring 004, and a button electronic device 005. The pen tip button structure body 001 is supported at the pen head housing 002 by a step and does not drop out. The retraction spring 004 is in a compressed state, such that the retraction spring 004 is supported on a positioning rib of the pen body housing 003, and is abutted against the pen tip button structure body 001 to prevent the pen tip button structure body 001 from shaking. As the resilience force of the retraction spring 004 is generally less than the operating pressure on the button electronic device 005, in this design solution, generally a part of spring's idle travel is reserved before the retraction spring contacts the button electronic device 005 to ensure that the retraction spring 004 is always in an operating state. This results in a larger travel of the pen tip button structure body 001 of this solution during pressing, that is, it is necessary to compress the retraction spring 004 firstly and then complete the travel of the button electronic device 005. Another disadvantage of this button structure is that as the pen tip button structure body 001 is assembled from the inside, the size of an exposed portion of the pen tip button structure body 001 is required to be smaller than the inner diameter of a via hole of the pen head housing 002, which brings certain limitations to the shape design. In addition, the safety is poorer due to the too sharp end portion of the pen tip button structure body 001.

Figure 2:
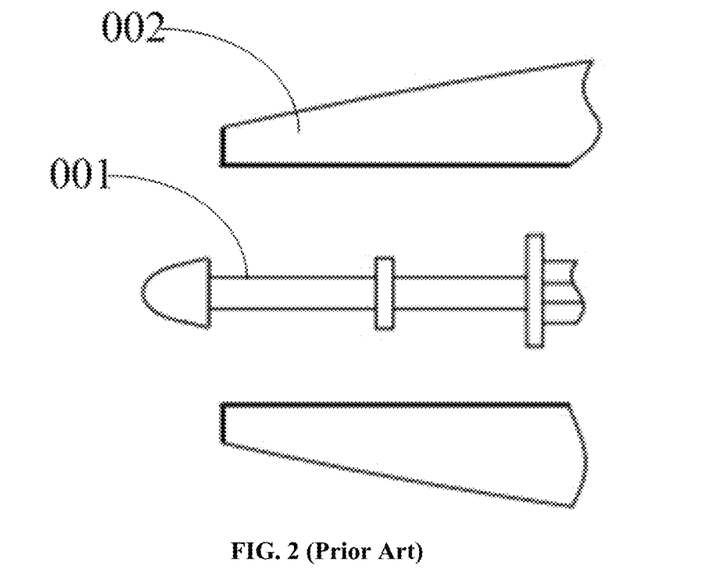
FIG. 2 is an exploded view of a second built-in electronic pen button structure.
Figure 3:
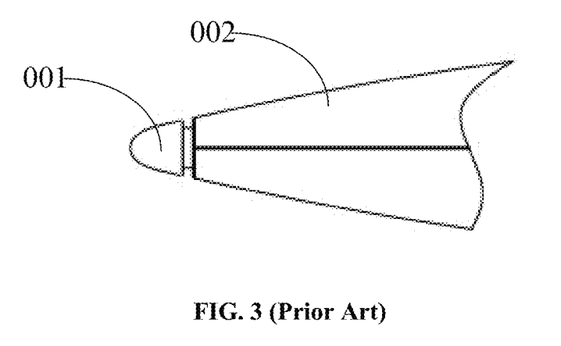
FIG. 3 is a diagram of an assembling relationship of the second built-in electronic pen button structure.

The size of the exposed portion of the pen tip button structure body 001 may also be designed to be larger than the inner diameter of the via hole of the pen head housing 002. For this setting solution, the specific solution is as shown in FIGS. 2 and 3. The pen head housing 002 is designed to include an upper piece and a lower piece which are separated from each other. When the pen head housing 002 is in a split state, the pen tip button structure body 001 is mounted in the pen head housing 002 and then the two portions of the pen head housing 002 are integrated. However, this solution will result in a parting line on the outside of the pen head housing 002.

For optimization of the button structure of the electronic pen, the present disclosure illustrates specific structures of two types of optional electronic pen button assemblies with reference to some embodiments.

First Embodiment

As shown in FIGS. 4 to 12, an electronic pen button assembly includes a pen core 1, a housing and a button 5. The pen core 1 includes a rod body 101 and a pen tip 102 disposed at a first end of the rod body 101. A first limiting portion is disposed on the rod body 101, and the first limiting portion is a groove 103 formed in the rod body 101. The housing includes a pen head 2 with a via hole 201, and the housing is provided with a second limiting portion, wherein the second limiting portion is a support member 4 fixed in the housing. A bump 401 matable with the groove 103 is formed on the support member 4. In addition, in an axial direction of the pen core 1, a span of the groove 103 is greater than a span of the bump 401. The rod body 101 extends into the housing through the via hole 201, the groove 103 is matably connected to the bump 401 on the support member 4, and the pen core 1 is in sliding fit relative to the housing in an extension direction of the rod body 101. The button 5 is disposed in the housing, and the button 5 may be triggered by a second end of the rod body 101 of the pen core 1 during sliding of the pen core 1 along the extension direction of the rod body 101.

A method for assembling the electronic pen button assembly according to this embodiment is as shown in FIGS. 4 to 10. The rod body 101 portion of the pen core 1 passes through the via hole 201 of the pen head 2 from the outside and then enters the interior of the housing. The groove 103 formed in the rod body 101 is engaged with the bump 401 on the support member 4 to matably connect the pen core 1 to the housing. As the span of the groove 103 is greater than the span of the bump 401 in the extension direction of the rod body 101, the pen core 1 reciprocates and slides in the extension direction of the rod body 101 relative to the housing, and thus whether the pen core 1 triggers the button 5 is controlled. In the case that the pen tip 102 of the pen core 1 touches a screen or other structure, the pen core 1 slides towards a position close to the button 5, the second end of the rod body 101 of the pen core 1 may be abutted against the button 5 and push the button 5 to slide towards a direction away from the pen core 1, and the button 5 is not triggered before the travel of the button 5 is completed. In the case that the pen tip 102 of the pen core 1 disengages from the external screen or other structure, the pen core 1 moves towards a direction away from the button 5 under the action of gravity, thereby releasing the triggering state of the button 5. The engagement limiting between the bump 401 and the groove 103 may prevent the pen core 1 from dropping out of the housing. The stable connection of the entire structure is achieved by the sliding fit and limiting of the bump 401 and the groove 103 which are designed in the embodiment of the present disclosure.

For the button assembly according to the embodiment of the present disclosure, the pen core 1 is capable of passing through the pen head 2 from the outside for assembly, that is, the assembly mode of the pen core 1 is an externally mounted mode relative to the pen head 2, which achieves the freer shape design of the pen tip 102 exposed to the outside. For example, in FIG. 6 of the embodiment of the present disclosure, the pen tip 102 is in the shape of a warhead, and a third engagement surface 106 is formed at the end, facing towards the pen head 2, of the pen tip 102. In the case that the pen core 1 moves along the direction away from the button 5 to a limit position, a gap g is defined between the third engagement surface 106 and an end surface 202 of the pen head 2. In the case that the pen core 1 moves along a direction close to the button 5 to another limit position, the third engagement surface 106 may be snugly engaged with the end surface 202 of the pen head 2, and in this state, the pen core 1 may trigger the button 5.

Figure 6:
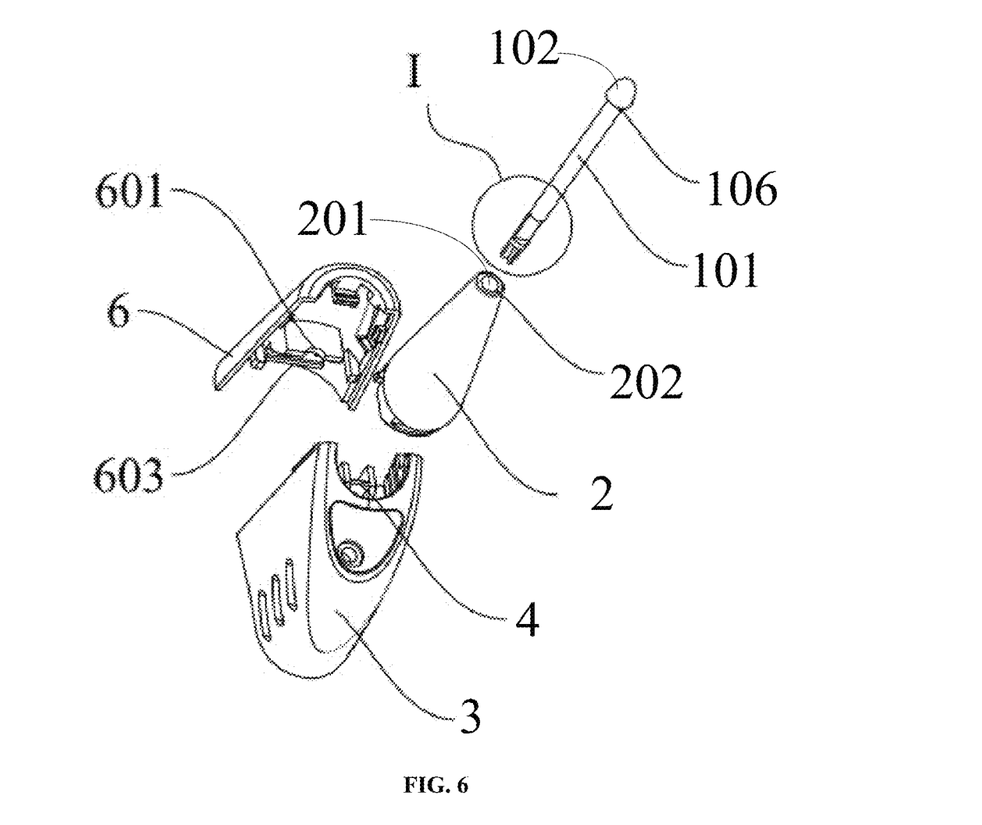
FIG. 6 is an isometric view I of an assembling relationship of the first electronic pen button assembly according to an embodiment of the present disclosure.
Figure 8:
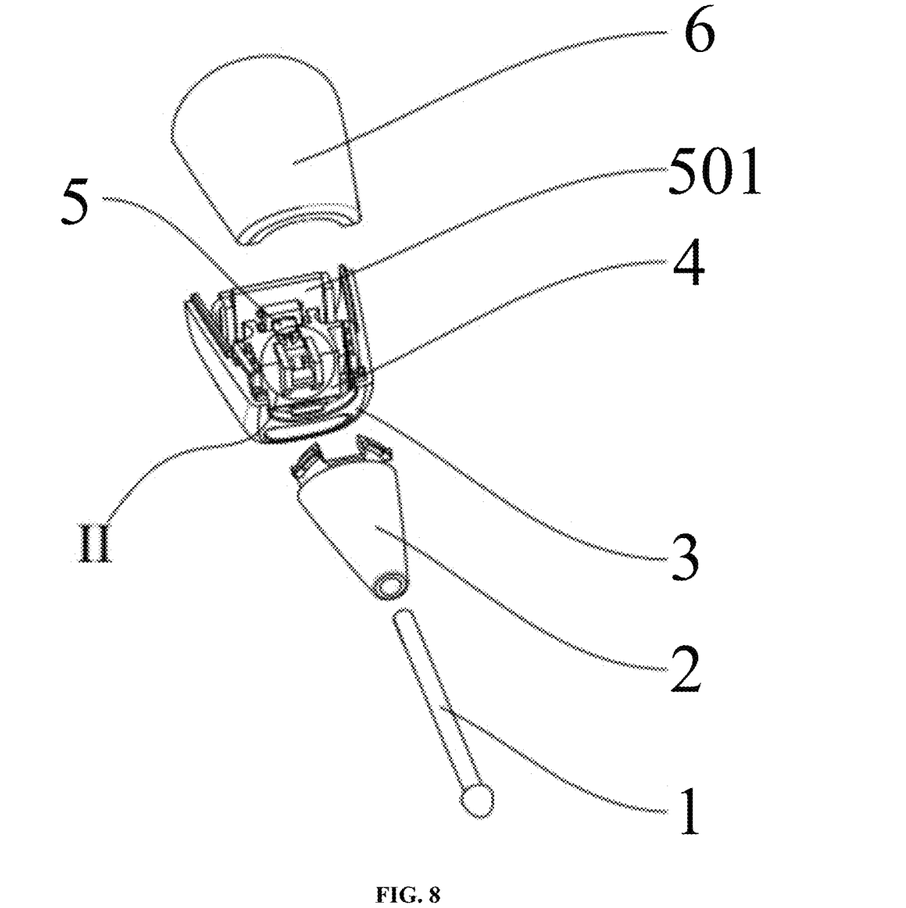
FIG. 8 is an isometric view II of the assembling relationship of the first electronic pen button assembly according to an embodiment of the present disclosure.
Figure 9:
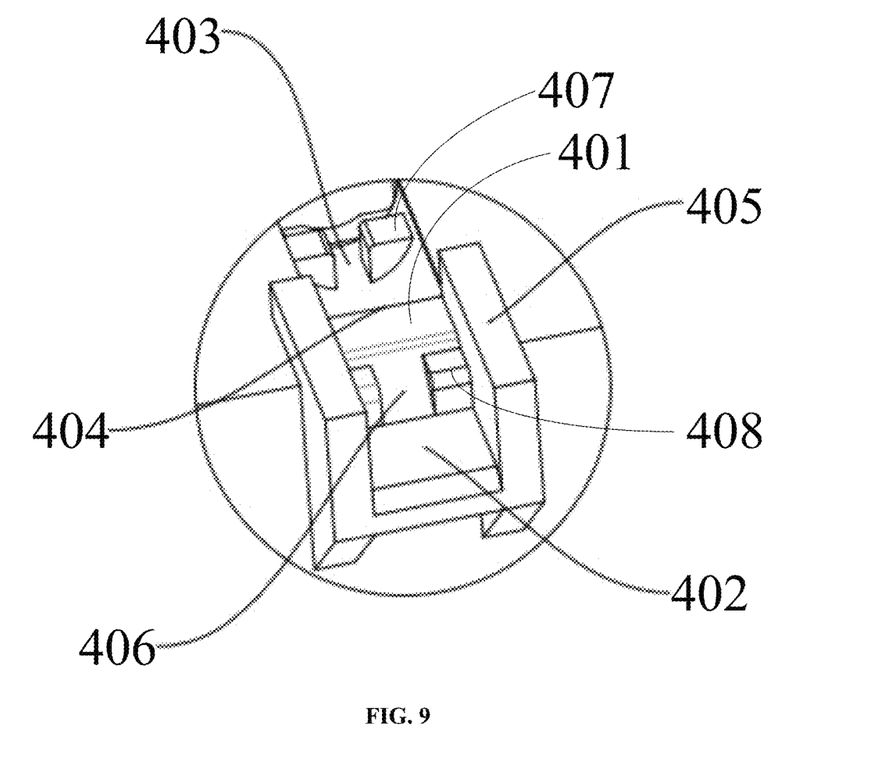
FIG. 9 is a partial enlarged view of a portion II in FIG. 8.

In some embodiments of the present disclosure, as shown in FIGS. 6 and 8, the housing includes a pen head 2, a first housing 3, and a second housing 6. The first housing 3 and the second housing 6 are connected to the pen head 2 in response to being engaged with each other and the support member 4 is disposed on an inner wall of the first housing 3. During assembling, the first housing 3 and the pen head 2 may be assembled and connected firstly and then the pen core 1 passes through the pen head 2 from the outside for being assembled with the support member 4. In the case that the groove 103 in the pen core 1 and the bump 401 of the support member 4 are not mated with each other automatically, at this time, the groove 103 and the bump 401 may be assembled in place by manual assistance. Afterwards, the second housing 6 is engaged on the first housing 3 to complete the assembling of the housing.

The support member 4 may be an independent structure and is detachably connected to the first housing 3. That is, the support member 4 is detachably assembled to the inner wall of the first housing 3. For example, as shown in the figures, the support member 4 is assembled to the inner wall of the first housing 3 by a screw. The support member 4 may also be integrally formed with the first housing 3, and a specific implementation solution depends on an internal space of the electronic pen actually used.

With reference to FIGS. 5, 9, 11, and 12, the support member 4 may include the bump 401, a first supporting surface 402, a second supporting surface 403 and two first limiting ribs 405. The first supporting surface 402 and the second supporting surface 403 are disposed on two sides of the bump 401 respectively in the extension direction of the rod body 101. The first supporting surface 402 is disposed between the bump 401 and the end surface 202 of the pen head 2, and the second supporting surface 403 is disposed between the bump 401 and the button 5. The bump 401 protrudes from the first supporting surface 402 and the second supporting surface 403, and is configured to be mated with the groove 103 in the pen core 1, and the first supporting surface 402 and the second supporting surface 403 are respectively configured to be partially mated with the rod body 101 portion on two sides of the groove 103.

The side, distal from the pen tip 102, of the groove 103 forms a first engagement surface 104, the side, facing towards the first engagement surface 104, of the bump 401 forms a second engagement surface 404. The interference fit between the first engagement surface 104 and the second engagement surface 404 prevents the pen core 1 from dropping out of the housing. In some embodiments, both the first engagement surface 104 and the second engagement surface 404 are perpendicular to the extension direction of the rod body 101.

In the structure of the support member 4, the two first limiting ribs 405 are disposed on two sides of the bump 401 respectively and may be configured to define a passage for allowing the rod body 101 to pass through. The passage may have a guide effect to prevent the rod body 101 from deviation in an assembling process. In addition, as the passage between the two first limiting ribs 405 needs to allow the rod body 101 to pass through, a distance between the two first limiting ribs 405 is slightly greater than a size of the rod body 101.

A guide slope 406 is formed on the side, facing towards the via hole 201, of the bump 401 of the support member 4 and is configured to connect the first supporting surface 402 and the top surface of the bump 401. During mounting of the pen core 1 into the housing, the second end of the rod body 101 of the pen core 1 may be abutted against the guide slope 406 firstly. In the case that the pen core 1 is forcefully pushed in continuously, the rod body 101 may be bent and deformed due to interaction and interference with the guide slope 406. The second end of the rod body 101 may slide to the top surface of the bump 401 along the guide slope 406, and continue to slide along the top surface of the bump 401 until the bump 401 directly faces the groove 103 in the rod body 101. Afterwards, the bump 401 is engaged with the groove 103 under the elastic acting force of the rod body 101. The bottom surface of the groove 103 may be snugly engaged with the top surface of the bump 401 by setting a height of the bump 401 or a depth of the groove 103, and the position limit is achieved by the first engagement surface 104 of the groove 103 and the second engagement surface 404 of the bump 401. The span of the groove 103 is greater than a total span of the top surface of the bump 401 and the guide slope 406. Thus, the rod body 101 may return to its original shape from the deformation and the bump 401 may not drop out due to cooperation with the groove 103; and further, the pen core 1 is allowed to have a specific movement travel.

Figure 7:
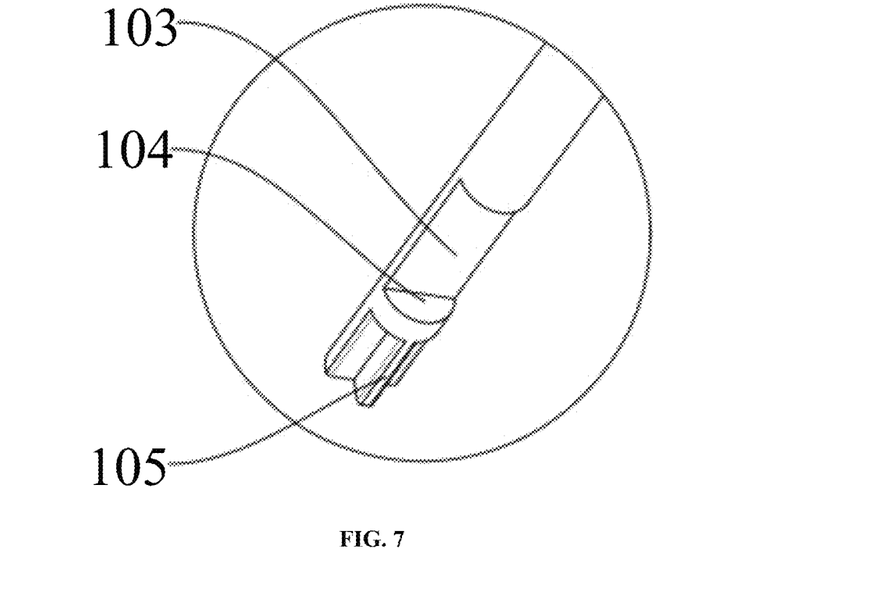
FIG. 7 is a partial enlarged view of a portion I in FIG. 6.

In some embodiments of the present disclosure, a foolproof portion is disposed at the second end of the rod body 101, and a third limiting portion matable with the foolproof portion is disposed on the support member 4. In the case that the foolproof portion and the third limiting portion are in a mated state, the rod body 101 is allowed to reciprocate in the extension direction of the rod body 101 and restrict the rod body 101 from rotating about an axis parallel to the extension direction of the rod body 101. In some embodiments, the foolproof portion is a foolproof sheet 105 disposed along the extension direction of the rod body 101, as shown in FIG. 7, and the third limiting portion is two second limiting ribs 407 disposed on the support member 4. A distance between the two second limiting ribs 407 matches a thickness of the foolproof sheet 105.

In addition, two third limiting ribs 408 are disposed on the guide slope 406, and a distance between the two third limiting ribs 408 is greater than the thickness of the foolproof sheet 105. The distance between the two third limiting ribs 408 on two sides of the guide slope 406 is slightly greater than the thickness of the foolproof sheet 105, and needs to be less than the size of the rod body 101 in a thickness direction of the foolproof sheet 105. Thus, when passing through the guide slope, the foolproof sheet 105 of the rod body 101 may only be pushed in in a guiding direction of a slideway defined by the two third limiting ribs 408. In the case that the foolproof sheet is inclined at an angle, the foolproof sheet may be blocked by the third limiting ribs 408 and fails to be mounted. The two second limiting ribs 407 are disposed on the second supporting surface 403, and the distance between the two second limiting ribs 407 is also slightly greater than the thickness of the foolproof sheet 105, but less than the distance between the two third limiting ribs 408. The two second limiting ribs 407 are configured for mandatory positioning, and the two third limiting ribs 408 are configured for rough guiding. Upon assembling, the two second limiting ribs 407 are mated with the foolproof sheet 105 to restrict the rod body 101 from rotating.

Figure 10:
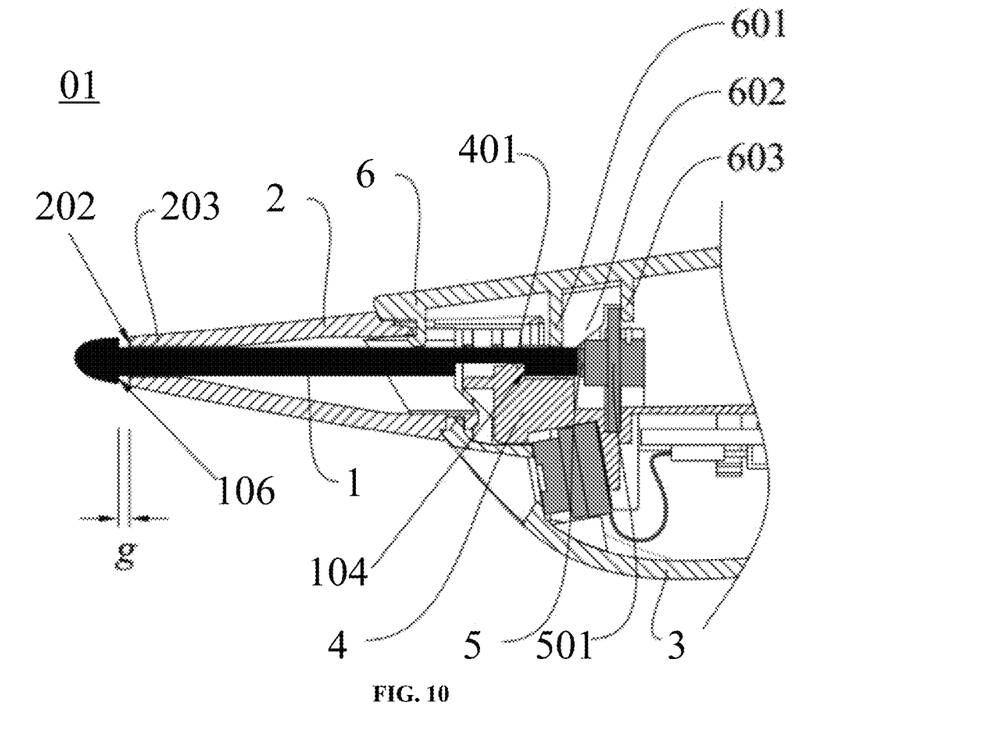
FIG. 10 is a sectional view of the first electronic pen button assembly according to an embodiment of the present disclosure.
Figure 11:
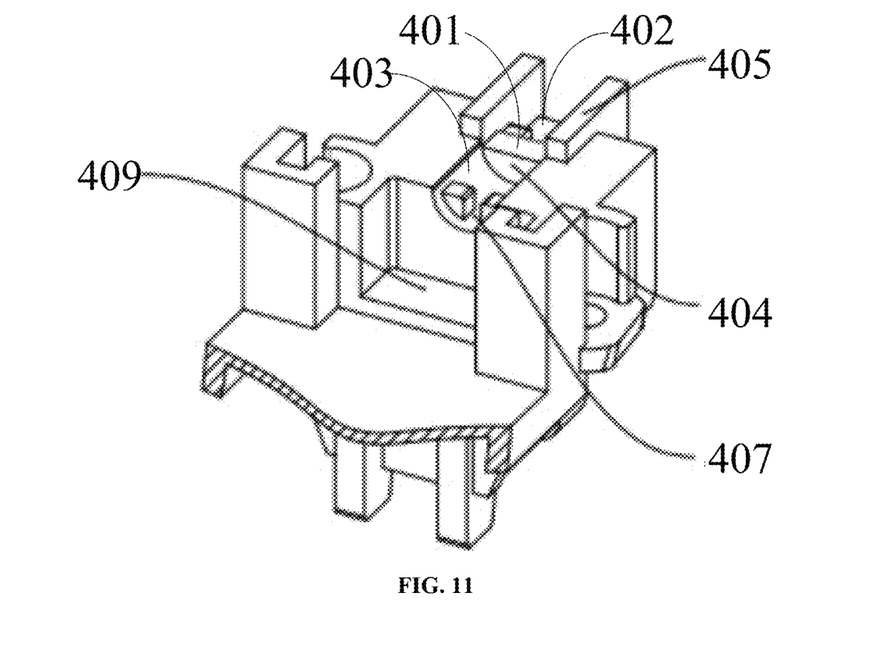
FIG. 11 is an isometric view I of a support member in the first electronic pen button assembly according to an embodiment of the present disclosure.
Figure 12:
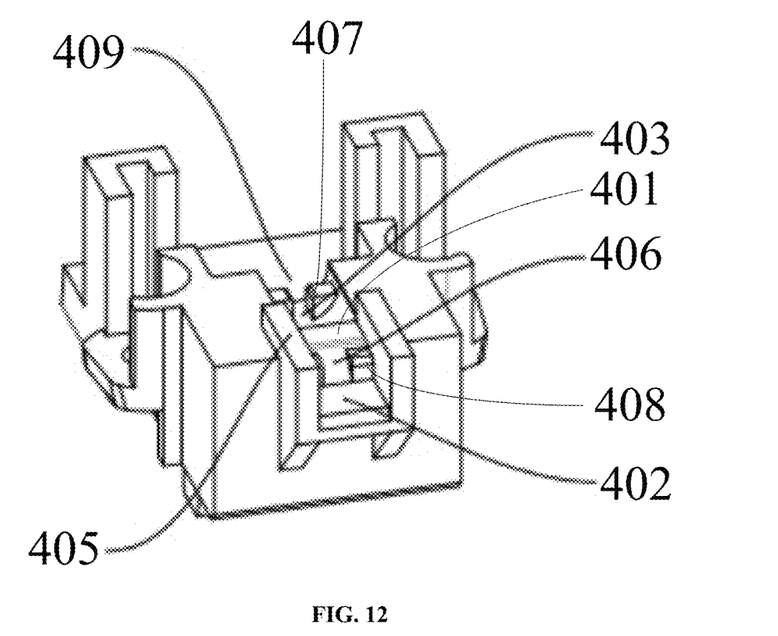
FIG. 12 is an isometric view II of the support member in the first electronic pen button assembly according to the embodiment of the present disclosure.

In some embodiments of the present disclosure, as shown in FIGS. 6 and 10, a first protrusive portion 601, a guide groove 602, and a second protrusive portion 603 are disposed on an inner wall of the second housing 6. In the case that the rod body 101 and the support member 4 are assembled, the end portion of the first protrusive portion 601 is abutted against the surface of the rod body 101. A button board 501 for fixing the button 5 between the first protrusive portion 601 and the second protrusive portion 603 is snugly engaged with the second protrusive portion 603. The guide groove 602 is disposed between the first protrusive portion 601 and the second protrusive portion 603. In the assembling process, the button board 501 and a slope of the guide groove 602 may slide relatively. In the case that the rod body 101 of the pen core 1 is engaged with the bump 401 of the support member 4 via the groove 103, the foolproof positioning has been initially completed, and the complete positioning may be completed in the case that the second housing 6 is engaged.

In some embodiments, in the case that the second housing 6 and the first housing 3 are engaged, the first protrusive portion 601 limits one side of the rod body 101, and the rod body 101 is clamped between the first protrusive portion 601 and the support member 4. An end portion of the first protrusive portion 601 is a groove-shaped structure mated with the surface shape of the rod body 101. In this way, the end portion of the first protrusive portion 601 may press the rod body 101 to prevent the rod body 101 from being deformed or warped during the operating process, which causes the rod body 101 disengages from the limiting member and the like.

In addition, when a misoperation occurs in the previous assembling steps, for example, the rod body 101 is mounted in a wrong direction, or the groove 103 in the rod body 101 is not engaged with the protrusive portion of the support member 4, or the rod body 101 does not return to its original shape from elastic deformation, the first protrusive portion 601 may interfere with the rod body 101 and cause engagement of the second housing 6 to fail. In this case, an assembling operator may know that there is a misoperation in the previous assembling steps, and thus make an adjustment in advance. This avoids the reworking cost arising from detecting and addressing the misoperation upon assembling of the whole device, and achieves the foolproof function during the assembling of the button assembly.

The button 5 is fixed to the housing by the button board 501, and a fixing groove 409 for placement of the button board 501 is fixed in the support member 4. In an assembling process, one side of the button board 501 is firstly placed in the fixing groove 409 in the support member 4 and then the second housing 6 is in engagement. The other side of the button board 501 slides along the slope of the guide groove 602 until the other side of the button board 501 is snugly engaged with the second protrusive portion 603 and finally the button board 501 is limited by the second protrusive portion 603, such that when the pen core 1 of the button assembly operates, the button board 501 no longer follows the pen core 1 to move backwards and become invalid. Upon assembling, in the state that the first engagement surface 104 and the second engagement surface 404 are mated with each other, the second end of the rod body 101 may be controlled to be just in contact with the button 5 on the button board 501, and the travel of the button board 5 is recorded as k. At this time, the button 5 may operate as long as a distance g between the third engagement surface 106 of the pen tip 102 and the end surface 202 of the pen head 2 is greater than k. That is, the effective travel g of the pen core 1 is all transferred to the travel k of the button 5, and thus the button 5 is triggered to operate. The difference between g and k depends on the tolerance.

Figure 4:
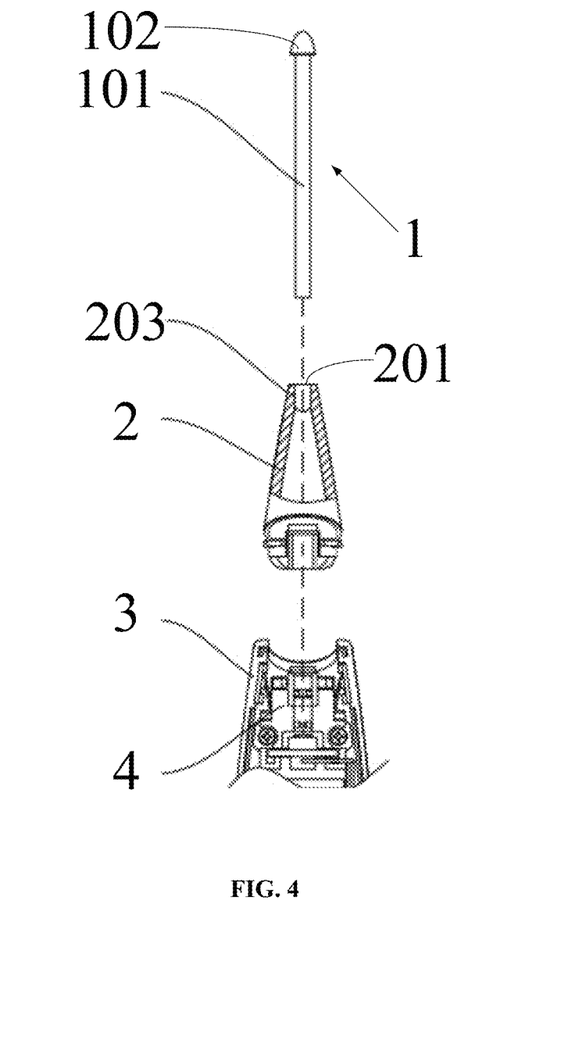
FIG. 4 is a structural assembling diagram of a first electronic pen button assembly according to an embodiment of the present disclosure.
Figure 5:
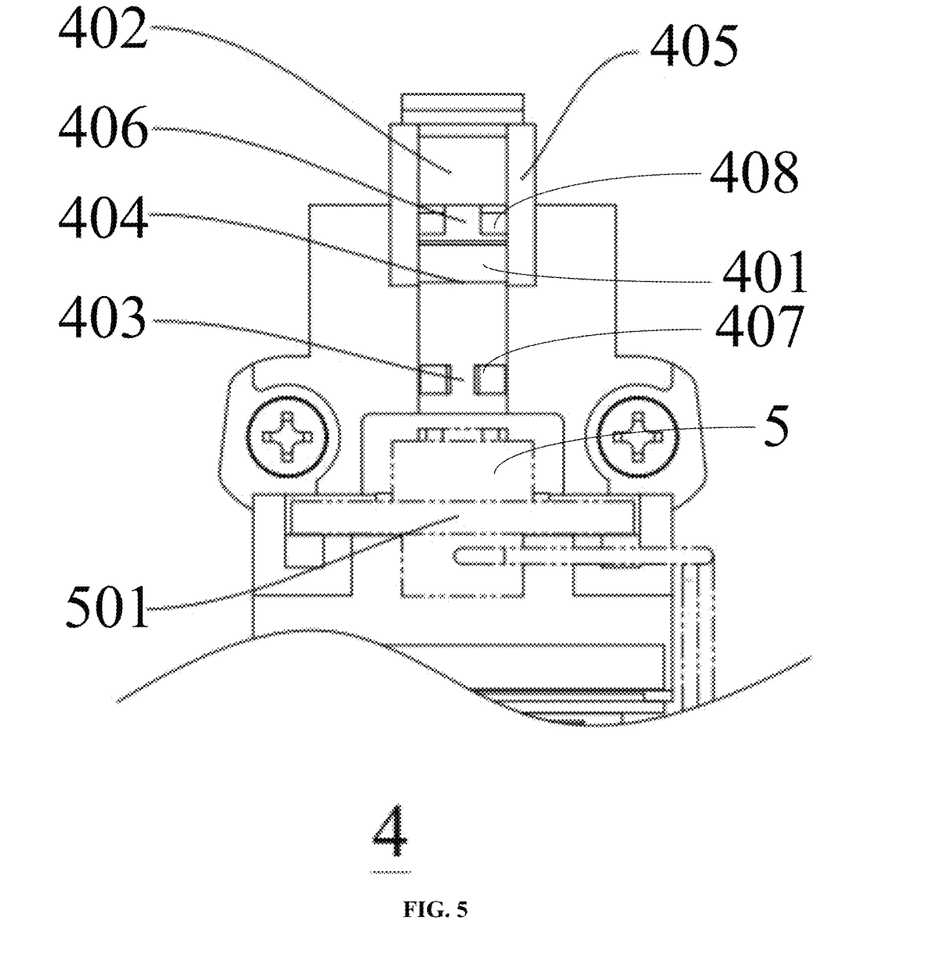
FIG. 5 is a partial enlarged view of a support member in FIG. 4.

In some embodiments of the present disclosure, as shown in FIGS. 4 and 10, a guide section 203 that matches a shape of the rod body 101 formed on the via hole 201 portion of the pen head 2. Both the guide section 203 and the rod body 101 are cylindrical structure and the guide section 203 is configured to guide the sliding of the rod body 101. In addition, the end surface 202 of the rod body 101 may be an elliptical surface. Likewise, the via hole 201 formed in the pen head 2 or the section of the guide section 203 may also be an elliptical hole. Such a transitional section may have a foolproof effect on the rod body 101, that is, in response to being inserted based on the guide section 203, the rod body 101 cannot rotate freely. This section may also be the other irregular foolproof shape in addition to the ellipse. The reason why the elliptical surface is selected in this embodiment is that the circumferential transition of the elliptical surface is smooth, and the exposed portion of the elliptical surface in this embodiment only is present at the short gap portion between the third engagement surface 106 of the pen tip 102 and the end surface 202 of the pen head 2, causing almost no effect on the appearance. No breaks and edges and corners can be seen from the gap in a circumferential direction and the section seems more like a circular section from the appearance.

In the case that it is impossible to dispose the first limiting portion on the rod body 101 as the rod body 101 of the pen core 1 is too thin due to a too small space of the guide section 203, the first limiting portion may also be designed on a new adapter and the adapter is fixedly connected to the rod body 101. That is, the rod body 101 adopts a split design. Space permitting, the first limiting portion is integrated with the rod body 101, and the rod body 101 adopts an integral design, such as the embodiment in the accompanying drawings of the present disclosure. This can reduce the cost.

Second Embodiment

Figure 13:
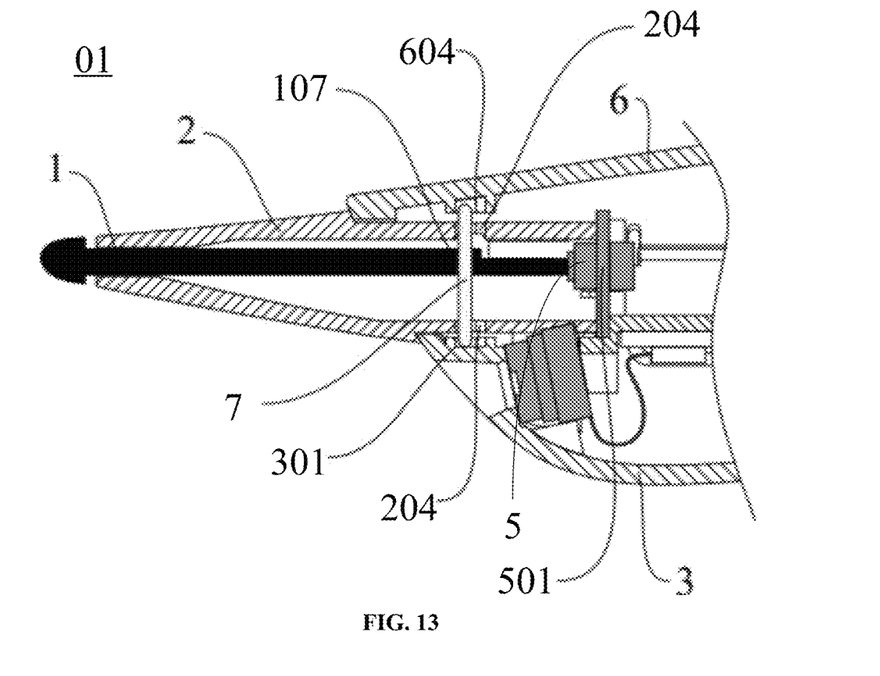
FIG. 13 is a sectional view of a second electronic pen button assembly according to an embodiment of the present disclosure.
Figure 15:
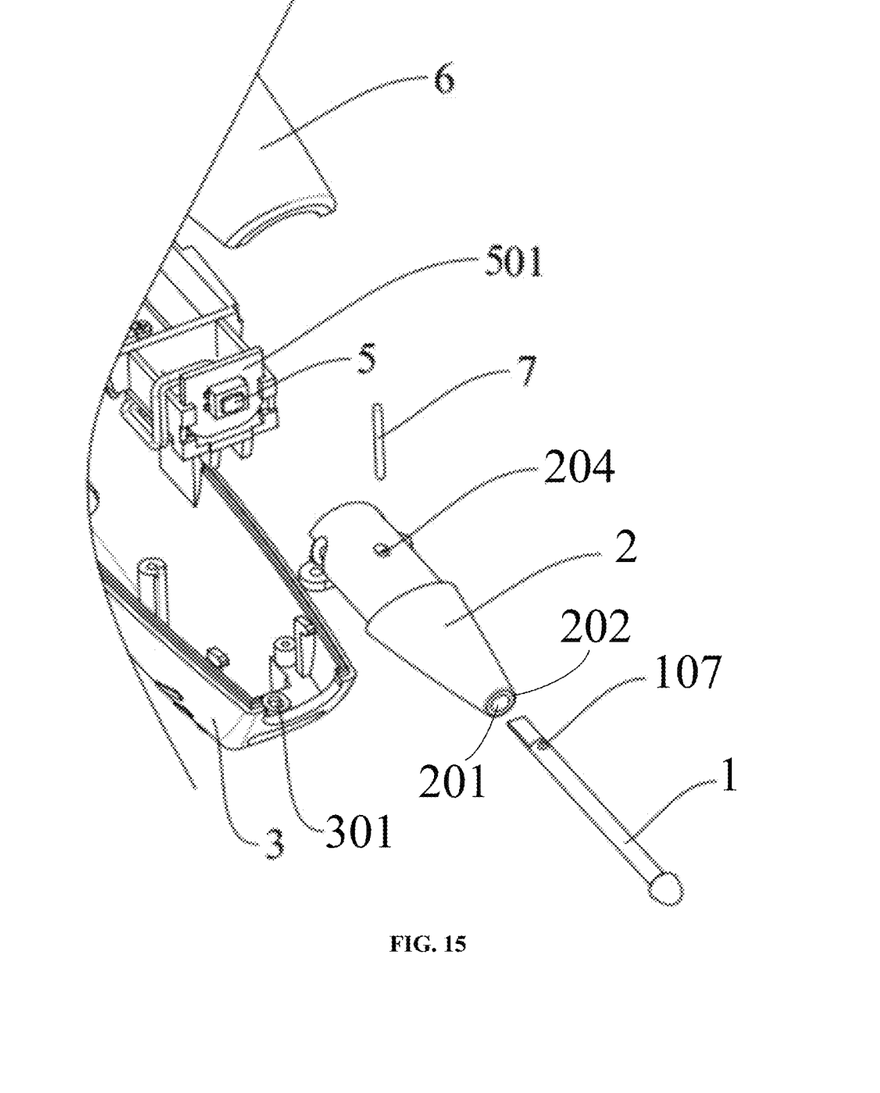
FIG. 15 is an isometric view of an assembling relationship of the second electronic pen button assembly according to an embodiment of the present disclosure.

As shown in FIGS. 13 and 15, an electronic pen button assembly includes a pen core 1, a housing, and a button 5. The pen core 1 includes a rod body 101 and a pen tip 102 disposed at a first end of the rod body 101. A first limiting portion is disposed on the rod body 101, and the first limiting portion is a pin shaft 7 disposed on the rod body 101. The housing includes a pen head 2 with a via hole 201, and the housing is provided with a second limiting portion, wherein the second limiting portion is a slideway formed in housing. An extension direction of the slideway is parallel to an extension direction of the rod body 101. The rod body 101 extends into the housing through the via hole 201, and the first limiting portion is matably connected to the second limiting portion. The pen core 1 is in sliding fit relative to the housing in the extension direction of the rod body 101. The button 5 is disposed in the housing, and the button 5 may be triggered by a second end of the rod body 101 during sliding of the pen core 1 along the extension direction of the rod body 101.

An assembling mode of the electronic pen button assembly according to this embodiment is as shown in the figures. The rod body 101 portion of the pen core 1 passes through the via hole 201 of the pen head 2 from the outside and then enters the interior of the housing. The pen core 1 is matably connected to the housing by assembling the pin shaft 7 disposed on the rod body 101 into the slideway of the housing. As a span of the slideway is greater than a span of the pin shaft 7 in the extension direction of the rod body 101, the pen core 1 reciprocates and slides in the extension direction of the rod body relative to the housing, and thus whether the pen core 1 triggers the button 5 is controlled. In the case that the pen tip 102 of the pen core 1 touches a screen or other structure, the pen core 1 may slide towards a direction close to the button 5, the second end of the rod body 101 of the pen core 1 may be abutted against the button 5 and push the button 5 to slide towards a direction away from the pen core 1, and the button 5 is not triggered before the travel of the button 5 is completed. In the case that the pen tip 102 of the pen core 1 disengages from the external screen or other structure, the pen core 1 may move towards a direction away from the button 5 under the action of gravity, thereby releasing the triggering state of the button 5. In addition, the sliding limiting between the pin shaft 7 and the slideway may prevent the pen core 1 from dropping out of the housing. The stable connection of the entire structure can be achieved by the sliding fit and limiting of the pin shaft 7, and the slideway which are designed in the embodiment of the present disclosure.

For the button assembly according to the embodiment of the present, the pen core 1 passes through the pen head 2 from the outside for assembling, that is, the assembling mode of the pen core 1 is an externally mounted mode relative to the pen head 2, which can achieve freer shape design of the pen tip 102 exposed to the outside. For example, in the drawing of the embodiment of the present disclosure, the pen tip 102 takes the shape of a warhead, and a third engagement surface 106 is formed at the end, facing towards the pen head 2, of the pen tip 102. In the case that the pen core 1 moves along the direction away from the button 5 to a limit position, a gap g is defined between the third engagement surface 106 and an end surface 202 of the pen head 2. In the case that the pen core 1 moves along the direction close to the button 5 to another limit position, the third engagement surface 106 may be snugly engaged with the end surface 202 of the pen head 2 and, the pen core 1 may trigger the button 5 in this process.

In some embodiments, the housing includes a pen head 2, a first housing 3, and a second housing 6. The first housing 3 and the second housing 6 are connected to the pen head 2 in response to being engaged with each other, and a support member 4 is disposed on an inner wall of the first housing 3. During assembling, the first housing 3 and the pen head 2 may be assembled and connected firstly, and then the pen core 1 passes through the pen head 2 from the outside for being assembled in place. Afterwards, the second housing 6 is engaged on the first housing 3, and thus the assembling of the housing is completed. In the assembling state, the pen head 2 may extend to enter a space between the first housing 3 and the second housing 6. The slideway includes two slideway holes 204 formed in the pen head 2, a first sliding groove 301 formed in the first housing 3, and a second sliding groove 604 formed in the second housing 6, the pin shaft 7 runs through the slideway holes 204, and the two ends of the pin shaft 7 are disposed in the first sliding groove 301 and the second sliding groove 604 respectively in a mating fashion.

The pin shaft 7 and the rod body 101 may adopt a split design. Thus, the rod body 101 is allowed to pass through the pen head 2 from the outside, then the pin shaft 7 and the rod body 101 are manually assembled, and finally the second housing 6 and the first housing 3 are engaged with each other. In some embodiments, a through fixing hole 107 is designed in the rod body 101, the diameter of the fixing hole 107 is equal to or slightly greater than the diameter of the pin shaft 7, and the pin shaft 7 is mated with the rod body 101 by passing the pin shaft 7 through the fixing hole 107.

During assembling, firstly, the pen head 2 is mated with the first housing 3 and the member for assembling include, but is not limited to, snaps and screws. Then, in the case that the rod body 101 of the pen core 1 passes through the via hole 201 of the pen head 2, the pin shaft 7 is inserted, and the pin shaft 7 sequentially passes through the slideway hole 204 in one side of the pen head 2, and the fixing hole 107 and the slideway hole 204 in the other side of the pen head 2, and finally drops into the first sliding groove 301 in the first housing 3. Finally, the second housing 6 is engaged on the first housing 3, and one end of the pin shaft 7 is disposed in the second sliding groove 604.

Figure 14:
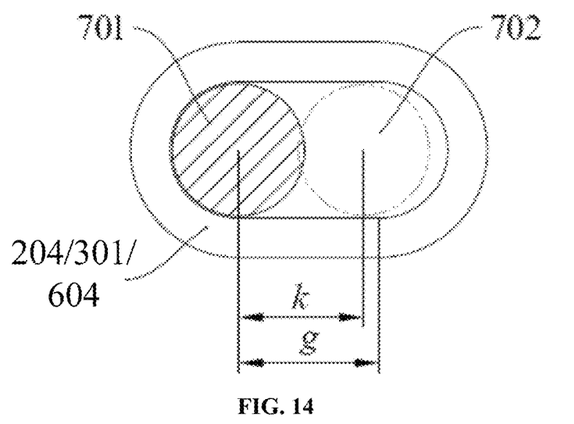
FIG. 14 is a diagram of a mating relationship of a pin shaft and a slideway in the second electronic pen button assembly according to an embodiment of the present disclosure.

Due to the close fitting of the pin shaft 7 in the fixing hole 107 of the rod body 101, the rod body 101 and the pin shaft 7 may be regarded as a whole. The slideway holes 204, the first sliding groove 301, and the second sliding groove 604 are all limiting structures, wherein the pin shaft 7 moves freely in a restricting fashion. Referring to FIG. 14, the section shape of the slideway holes 204, the section shape of the first sliding groove 301, and the section shape of the second sliding groove 604 are illustrated. The pin shaft 7 has two limit positions in the slideway. The button 5 is in a sprung-up state at the first limit position 701, and the button 5 is in a compressed state at the second limit position 702, and at this time the button 5 is triggered to operate.

In some embodiments, the section shape of the slideway is designed as a racetrack circle, and a distance between centers of two circles of the racetrack circle is equal to g (that is, the distance between the centers of the two circles of the racetrack circle may be equal to a maximum distance between the third engagement surface 106 of the pen tip 102 and the end surface 202 of the pen head 2). Likewise, it is assumed that the travel of the button 5 is k, the button may operate normally under the condition that g>k is satisfied in the design. That is, in the case that the button board 501 is mounted, a distance between the first limit position and the second limit position of the pin shaft in the racetrack is equal to k under normal operating.

The other technical means except the first limiting portion and the second limiting portion in Embodiment 1 may also be applicable to Embodiment 2, which include but are not limited to the section shape of the rod body 101, the setting of the guide section 203, and the like. For the details, reference may be made to the first embodiment. The structures according to the first embodiment and the second embodiment of the present disclosure are pen tip button structures adopting an externally mounted mode. Thus, the portion of the pen tip exposed to the outside may be in any shape, the shape design of the pen tip is freer, and the pen tip may be connected to the curve at the pen head more smoothly. In addition, by the internal engaging structure designed in this solution, the button cannot drop out. Moreover, in the case that the shape of the pen tip is asymmetrical, the pen tip can be mounted in a foolproof fashion, and is completely limited, which can improve the stability of the pen tip button and avoid defects such as button jamming caused by abrasion arising from rotation.

It should be noted that other components and operations of the electronic pen button assembly according to the embodiment of the present disclosure are known to those of ordinary skill in the art, which may be referenced to the structure of the related device in the related art, which are not described in detail herein.

Figure 16:
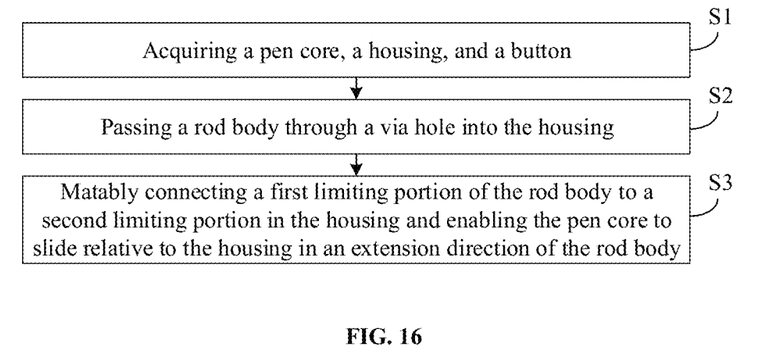
FIG. 16 is a flowchart of a method for assembling an electronic pen button assembly according to an embodiment of the present disclosure.

FIG. 16 is a flowchart of a method for assembling an electronic pen button assembly according to an embodiment of the present disclosure. With reference to FIG. 16, the method may include the following processes.

In S1, a pen core, a housing, and a button are acquired.

The pen core includes a rod body and a pen tip disposed at a first end of the rod body. A first limiting portion is disposed on the rod body. The housing includes a pen head with a via hole, and a second limiting portion is disposed in the housing. The button is disposed in the housing.

In S2, the rod body is passed through the via hole into the housing.

A second end of the rod body may pass through the via hole and enter the interior of the housing.

In S3, the first limiting portion of the rod body is matably connected to the second limiting portion in the housing, and the pen core is caused to slide relative to the housing in an extension direction of the rod body.

The button may be triggered by the second end of the rod body during sliding of the pen core.

Figure 17:
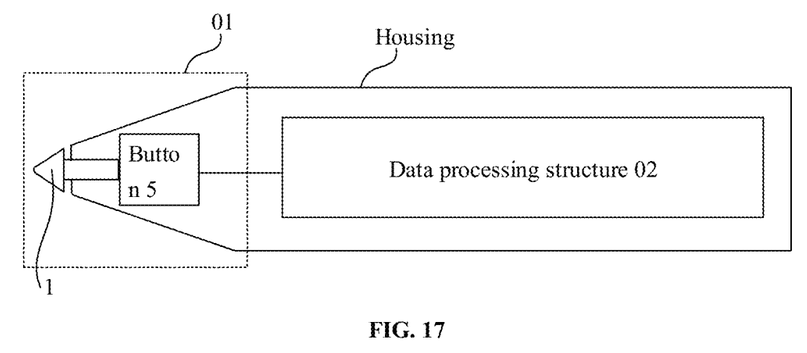
FIG. 17 is a schematic structural diagram of an electronic pen according to an embodiment the present disclosure.

FIG. 17 is a schematic diagram of an electronic pen according to an embodiment the present disclosure. Reference to FIG. 17, the electronic pen may include an electronic pen button assembly 01 and a data processing structure 02. A button 5 of the electronic pen button assembly 01 may be connected to the data processing structure 02, and the data processing structure 02 may be disposed in a housing of the electronic pen button assembly 01.

The data processing structure 02 may be configured to receive a triggering signal transmitted by the button 5, and perform subsequent processing based on this triggering signal. In some embodiments, the data processing structure 02 may be, for example, a chip of a processor.

An embodiment of the present disclosure further provides an electronic pen. The electronic pen includes the electronic pen button assembly according to Embodiment 1 or Embodiment 2 above of the present disclosure. The electronic pen may be an electronic pen of various structures and uses in the related art, which includes but is not limited to a reading pen, a translating pen, a stylus, and a dot matrix pen. The electronic pen includes an electronic pen button assembly and a data processing structure.

As the electronic pen according to the embodiment of the present disclosure includes the electronic pen button assembly according to the above embodiments, the electronic pen having this electronic pen button assembly also achieves all technical effects above, which are not repeated herein one by one. Other components and operations of the electronic pen are known to those ordinary skilled in the art, which are not described in detail herein.

The embodiments in this description are described in a progressive fashion. Each embodiment focuses on differences from other embodiments, and the same or similar parts among the various embodiments may be referred to one another.

The above are only specific embodiments of the present disclosure, such that those skilled in the art may understand or implement the present disclosure. Various modifications to these embodiments will be obvious to those skilled in the art, and the general principles defined herein may be implemented in other embodiments without departing from the spirit or scope of the present disclosure. Thus, the present disclosure will not be limited to the embodiments shown herein, but should conform to the widest scope consistent with the principles and novel features applied for herein.

What is claimed is:

1. An electronic pen button assembly, comprising:
   a pen core comprising a rod body and a pen tip disposed at a first end of the rod body, wherein the rod body is provided with a first limiting portion;
   a housing comprising a pen head with a via hole, wherein the housing is provided with a second limiting portion, the rod body extends into the housing through the via hole, the first limiting portion is matably connected to the second limiting portion, and the pen core is in sliding fit relative to the housing in an extension direction of the pen core; and
   a button disposed in the housing, wherein the button is triggerable by a second end of the rod body during sliding of the pen core,
   wherein the first limiting portion is a groove formed in the rod body, and the second limiting portion is a support member fixed in the housing, wherein a bump matable with the groove is formed on the support member, and in an extension direction of the rod body, a span of the groove is greater than a span of the bump which allows the groove directly contact with the bump to still slide on the bump in the extension direction of the rod body.

2. The electronic pen button assembly according to claim 1, wherein a side, distal from the pen tip, of the groove forms a first engagement surface, and a side, facing towards the first engagement surface, of the bump forms a second engagement surface.

3. The electronic pen button assembly according to claim 1, wherein the support member further comprises two first limiting ribs disposed on two sides of the bump respectively, wherein the two first limiting ribs are configured to define a passage for allowing the rod body to pass through.

4. The electronic pen button assembly according to claim 1, wherein a guide slope is formed on a side, facing towards the via hole, of the bump.

5. The electronic pen button assembly according to claim 1, wherein a foolproof portion is disposed at the second end of the rod body, and a third limiting portion matable with the foolproof portion is disposed on the support member;
   wherein in a case that the foolproof portion and the third limiting portion are in a mated state, the rod body is allowed to reciprocate in the extension direction of the rod body and restrict the rod body from rotating about an axis of the rod body, the axis of the rod body being parallel to the extension direction of the rod body.

6. The electronic pen button assembly according to claim 5, wherein the foolproof portion comprises a foolproof sheet disposed along the extension direction of the rod body, and the third limiting portion comprises two second limiting ribs disposed on the support member, wherein a distance between the two second limiting ribs matches a thickness of the foolproof sheet.

7. The electronic pen button assembly according to claim 6, wherein a guide slope is formed on a side, facing towards the via hole, of the bump, and two third limiting ribs are disposed on the guide slope, wherein a distance between the two third limiting ribs is greater than the thickness of the foolproof sheet.

8. The electronic pen button assembly according to claim 1, wherein the housing further comprises a first housing and a second housing which are engaged with each other; wherein the first housing and the second housing are connected to the pen head in response to being engaged with each other, the support member is disposed on the first housing, and a first protrusive portion is disposed on an inner wall of the second housing, an end portion of the first protrusive portion being abutted against a surface of the rod body.

9. The electronic pen button assembly according to claim 8, wherein the support member is detachably connected to the first housing.

10. The electronic pen button assembly according to claim 8, wherein a second protrusive portion, and a button board for fixing the button are further disposed on the inner wall of the second housing, wherein the button board is disposed between the first protrusive portion and the second protrusive portion and is snugly engaged with the second protrusive portion.

11. The electronic pen button assembly according to claim 10, wherein a guide groove is disposed between the first protrusive portion and the second protrusive portion;

wherein the button board may slide along a slope of the guide groove.

12. The electronic pen button assembly according to claim 1, wherein the rod body adopts an integral design.

13. The electronic pen button assembly according to claim 1, wherein the rod body adopts a split design.

14. The electronic pen button assembly according to claim 13, wherein the housing further comprises a first housing and a second housing which are engaged with each other, wherein the first housing and the second housing are connected to the pen head in response to being engaged with each other; and a slideway comprises two slideway holes formed in the pen head, a first sliding groove formed in the first housing, and a second sliding groove formed in the second housing, wherein a pin shaft runs through the slideway holes, and two ends of the pin shaft are disposed in the first sliding groove and the second sliding groove respectively in a mating fashion.

15. The electronic pen button assembly according to claim 1, wherein a section of the rod body is elliptical.

16. The electronic pen button assembly according to claim 1, wherein a guide section that matches a shape of the rod body is formed on a portion of the pen head that includes the via hole.

17. A method for assembling an electronic pen button assembly, comprising:

acquiring a pen core, a housing, and a button; wherein the pen core comprises a rod body and a pen tip disposed at a first end of the rod body, the rod body being provided with a first limiting portion; the housing comprises a pen head with a via hole, and the housing is provided with a second limiting portion; and the button is disposed in the housing;

passing the rod body through the via hole into the housing; and matably connecting the first limiting portion of the rod body to the second limiting portion in the housing, and causing the pen core to slide relative to the housing in an extension direction of the rod body, wherein the button is triggerable by a second end of the rod body during sliding of the pen core, wherein the first limiting portion is a groove formed in the rod body, and the second limiting portion is a support member fixed in the housing, wherein a bump matable with the groove is formed on the support member, and in an extension direction of the rod body, a span of the groove is greater than a span of the bump which allows the groove directly contact with the bump to still slide on the bump in the extension direction of the rod body.

18. An electronic pen, comprising a data processing structure and an electronic pen button assembly, wherein the electronic pen button assembly comprises:

a pen core comprising a rod body and a pen tip disposed at a first end of the rod body, wherein the rod body is provided with a first limiting portion;

a housing comprising a pen head with a via hole, wherein the housing is provided with a second limiting portion, the rod body extends into the housing through the via hole, the first limiting portion is matably connected to the second limiting portion, and the pen core is in sliding fit relative to the housing in an extension direction of the pen core; and a button disposed in the housing, wherein the button is triggerable by a second end of the rod body during sliding of the pen core, wherein the first limiting portion is a groove formed in the rod body, and the second limiting portion is a support member fixed in the housing, wherein a bump matable with the groove is formed on the support member, and in an extension direction of the rod body, a span of the groove is greater than a span of the bump which allows the groove directly contact with the bump to still slide on the bump in the extension direction of the rod body.

\* \* \* \* \*